Nov. 14, 1950  C. E. SULLIVAN  2,529,889
ROAD SANDING MACHINE

Filed June 20, 1946  2 Sheets-Sheet 1

C. E. Sullivan
Inventor
By Frank B. Wooden Attorney.

Nov. 14, 1950 — C. E. SULLIVAN — 2,529,889
ROAD SANDING MACHINE
Filed June 20, 1946 — 2 Sheets-Sheet 2

C. E. Sullivan, Inventor
By Frank B. Wood, Attorney

Patented Nov. 14, 1950

2,529,889

UNITED STATES PATENT OFFICE 2,529,889

ROAD SANDING MACHINE

Clifford E. Sullivan, Reisterstown, Md.

Application June 20, 1946, Serial No. 678,047

4 Claims. (Cl. 275—8)

This invention relates to a device for spreading sand, cinders or other material over a roadway to prevent slipping of vehicles traveling thereover and has for its object the provision of a device that may be readily attached to a prime mover without the attention or assistance of a mechanic other than the driver of the vehicle to which the spreader is attached.

Another object is the provision of a device which is self feeding and is attached to the rear of a dump truck in such position that as the truck body is elevated to dumping position the feeding and distributing mechanism of the device is brought into action to spread material on the road.

Another object is the provision of a self contained structure which is independent of any drive mechanism other than the drive provided by the device within itself.

Another object is the provision of novel means for permitting relative movement between the several elements, said movement occurring on an undulating roadway.

Other objects and advantages will present themselves as the description proceeds.

It will be understood that changes may be made in the structure disclosed within the scope of the appended claims without departing from the spirit of the invention or sacrificing any of the advantages thereof.

Figure 1:
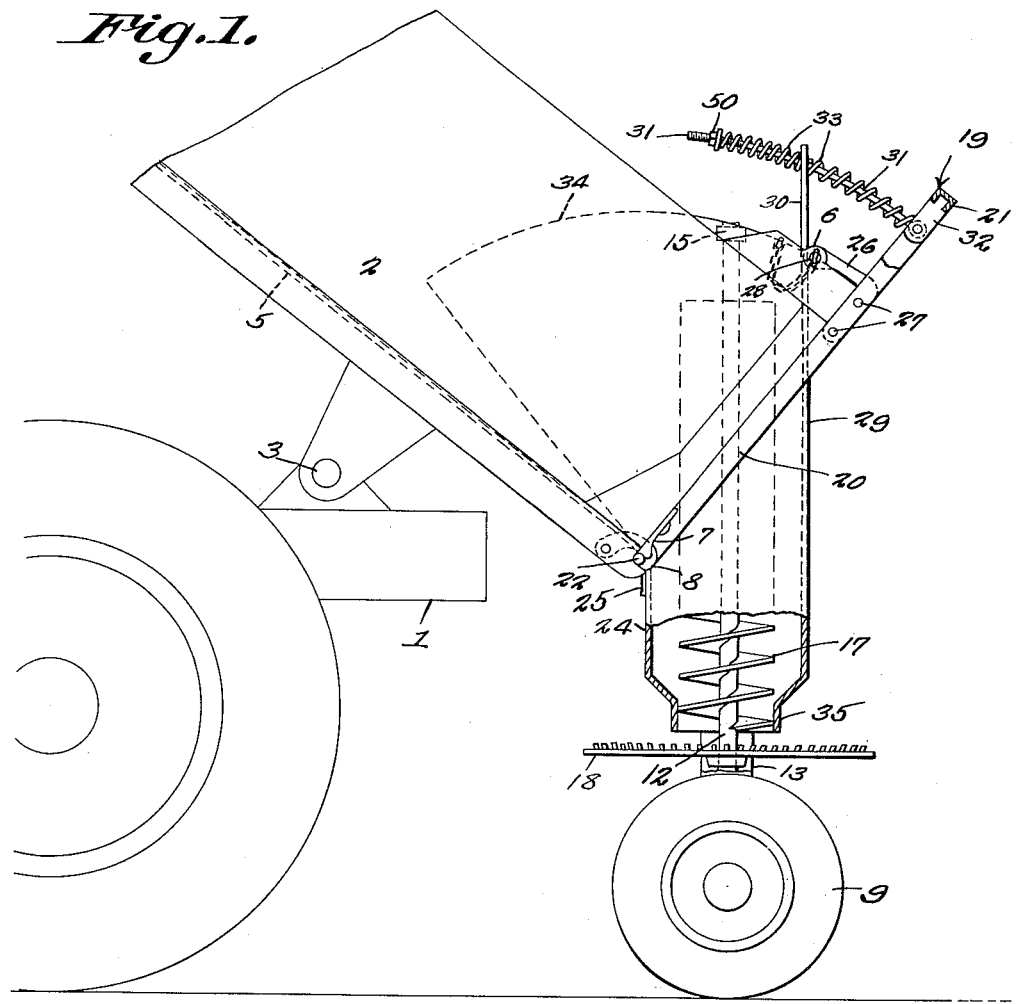
Figure 1 is a view in side elevation partially in section of the device as attached to a dump truck in position for operation.
Figure 4:
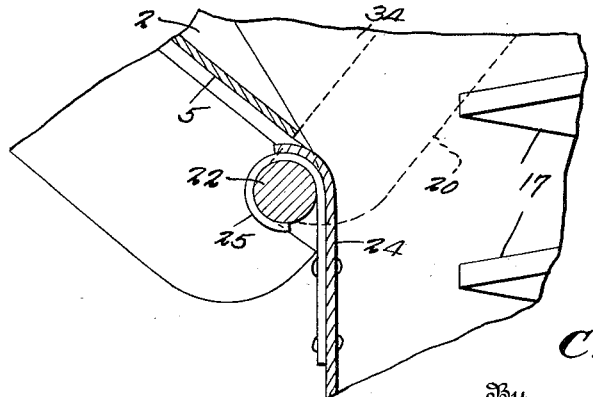
Figure 4 is an enlarged sectional view on line 4—4 of Figure 2.
Figure 2:
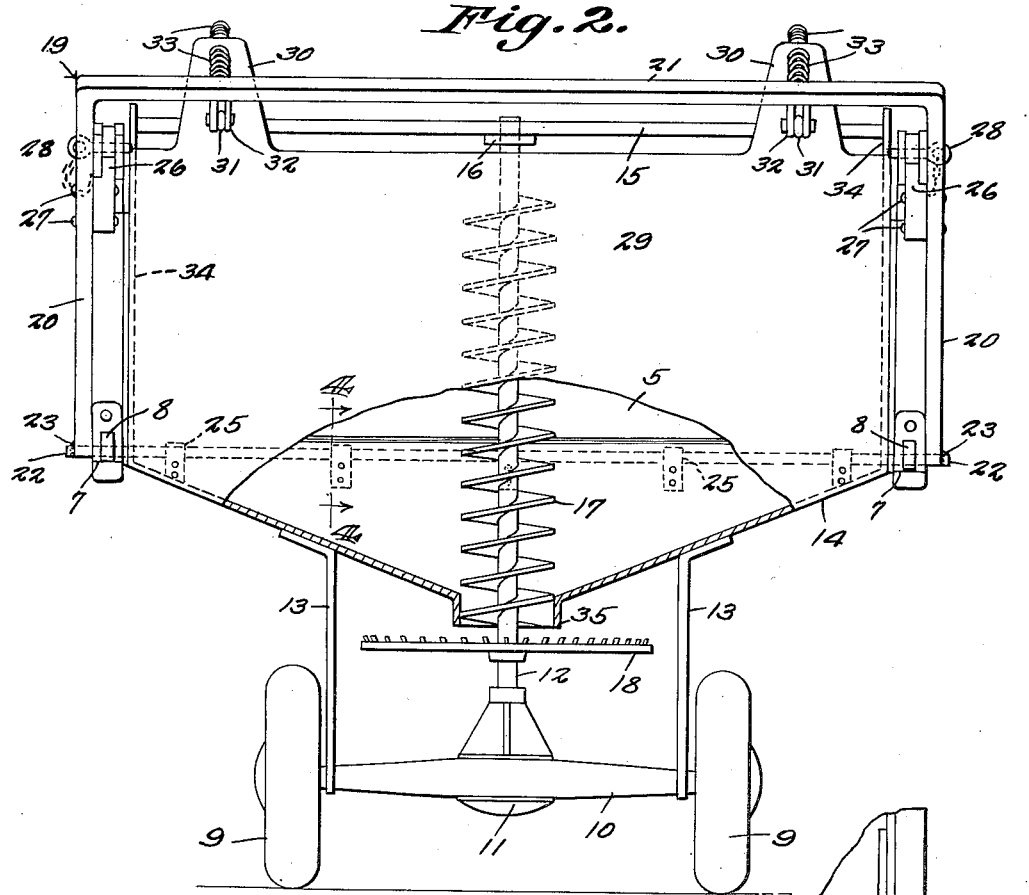
Figure 2 is a view in rear elevation, there being parts shown in section.
Figure 3:
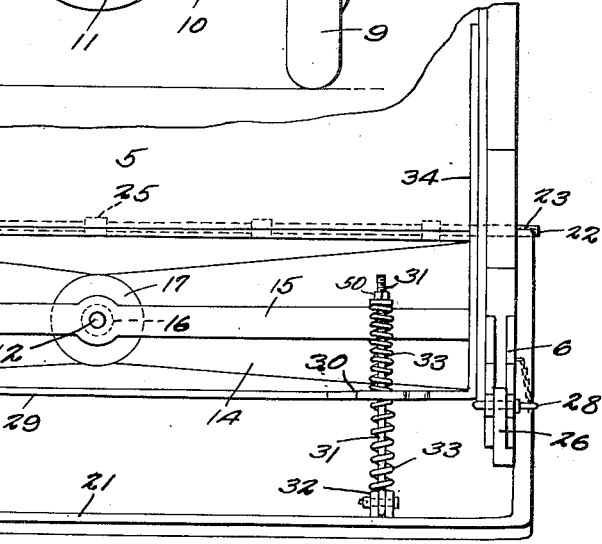
Figure 3 is a plan view of the device.

Referring to the drawings by characters of reference, 1 designates the chassis of a conventional dump truck and 2 the body thereof, the body being pivotally connected at 3 to the chassis in the usual manner. The numeral 5 designates the floor of the truck body. At 6 is shown the hinge shackle to which the usual tail gate is hingedly connected at the top of the body 2 and the shackles for securing the lower side of the tail gate to the body are marked by the numeral 7. Latches 8 are mounted at each of the shackles 7 and are operated from the driver's seat in the usual and well known manner, all of which thus far described is conventional and to be found on the type of trucks to which the present invention is to be attached.

The numeral 9 indicates traction wheels mounted on an axle 10. The axle supports a differential housing 11, from which extends a jack shaft 12. Bars 13 are secured to the axle 10 and extend upwardly to support a hopper 14. The hopper is provided at the top with a cross member 15. The jack shaft 12 extends through the hopper as shown and has a bearing 16 in the cross bar 15. A feed worm 17 carried by the shaft 12 extends approximately throughout the depth of the hopper and forces a predetermined amount of sand to the whirling disk 18 which is secured to the shaft 12.

A frame 19 comprising side members 20 and a cross bar 21 at the top thereof is designed to be installed in place of the usual tail gate which is removed from the truck body before installation of the present invention.

A rod 22 extends across the rear of the body below the floor 5. Opposite ends of the rod are adapted to be seated in the shackles 7 and held therein by the latches 8.

The arms 20 are welded or otherwise secured to the projecting ends of the rod 22 as shown at 23 thus completing the substantial frame 19 on which to hingedly mount the hopper and spreading mechanism.

The front wall 24 of the hopper terminates at a point adjacent the bar 22 and beneath the floor 5 of the truck body. Straps 25 constituting hinge members are secured to the wall 24 at its upper edge and are bent about the rod 22 as shown, providing hinged connection between the spreader device and the truck body.

Members 26 duplicating the connecting hinge members of the tail gate are secured to the frame as shown at 27 and are attached to the shackle 6 by the pin 28 previously used to secure the tail gate in position at its upper side.

Extended upwardly from the rear wall 29 of the hopper are standards 30. Rods 31 are pivotally connected to brackets 32 extending from the cross member 21.

A rod 31 for each standard 30 is extended therethrough, the opening in the standard being of a size to permit free movement of the rod 31.

Importance is attached to the speed and ease with which change may be made from an ordinary hauling truck of the class used in road maintenance to that of a sanding device for use on slippery highways. The change may be made if need be single handed by the operator of the truck as follows: after removal of the ordinary tail gate and with the truck body at the correct elevation in dumping position and with the latches 8 raised to permit entrance of the rod 22, the operator backs the truck up to the upright sanding device. The rod 22 enters the shackles 7 and the members 26 move into the upper shackles 6. The operator manipulates the lever controlling the latches 8 to drop them over the rod 22 and then proceeds to insert the pins 28 through registering holes in the member 26 and the shackles 6. Through this simple operation the sander is securely attached to the truck.

After lowering the truck body, which action removes the spreader wheels from contact with the road, the truck may be moved to the point of loading.

In the application of abrasive to a slippery surface it will be apparent that no manual handling of the material is necessary, the material sliding from the inclined floor of the truck into the hopper.

It sometimes happens that when visibility is low, traffic vehicles approaching from the rear collide with the sanding outfit in use on the road.

In a device constructed in accordance with the present invention, manual handling of material to the distributor is eliminated and the chance of workmen being injured is avoided.

Having thus described the invention what is claimed;

1. In a sanding extension for a tiltable dump body, a hopper hinged intermediate its upper and lower ends to the rear end of said body and projecting rearwardly and downwardly from and forming an extension of said body, the upper portion of said hopper being open at its front in full communication with the interior of said body, said hopper including forwardly extended side wings in sliding contact with the side walls of the body; a carriage rigid with the lower end of the hopper and including road-engaging wheels; an axle mounted in the carriage for rotation by the wheels; an upstanding feed worm rotatably mounted in and extending downwardly through the lower end of the hopper to feed material through said lower end of the hopper; a distributing disk secured to the lower end of the feed worm for rotation therewith; a geared driving connection between the axle and the feed worm; spaced rods pivotally connected at one end to the rear end of the body and slidable in the hopper wall at the upper end of the hopper; and a pair of springs on each rod, the springs of each pair exerting pressure against opposite sides, respectively, of the hopper wall.

2. In a sanding extension for a tiltable dump body, a hopper hinged intermediate its upper and lower ends to the rear end of said body and projecting rearwardly and downwardly from and forming an extension of said body, the upper portion of the hopper being open at its front in full communication with the interior of the body, the hopper including forwardly extended side wings in sliding contact with the side walls of the body; a cross member rigid with and extending over the rear end of the body; and spaced resiliently compressible connections interposed between the upper end of the hopper and the cross member and yieldably retaining said hopper in oblique relation to the body.

3. In a sanding extension for a tiltable dump body, a hopper hinged intermediate its upper and lower ends to the rear end of said body and projecting rearwardly and downwardly from and forming an extension of said body, the upper portion of the hopper being open at its front in full communication with the interior of said body, said upper portion of the hopper including forwardly extended side wings in sliding contact with the side walls of the body; a cross member rigid with the body and bridging the rear end thereof; spaced rods pivotally connected at one end to the cross member and slidable in the hopper wall at the upper end of the hopper; and a pair of springs on each rod, the springs of each pair exerting pressure against opposite sides, respectively, of the hopper wall.

4. In a sanding extension for a tiltable dump body, a hopper having a front wall pivotally connected intermediate the upper and lower ends of the hopper to the rear end of said body, said hopper projecting rearwardly and downwardly from the body to constitute a rear extension thereof, the upper portion of the hopper being open at its front to provide full communication between the hopper and the interior of the body; side wings extending forwardly from said upper portion of the hopper into the body and having sliding contact with the side walls of the body; a carriage rigid with and depending from the lower end of the hopper; said carriage including road-engaging wheels; an axle mounted in the carriage for rotation by the wheels; an upstanding feed worm rotatably mounted in and extending downwardly through the lower end of the hopper to feed material through said lower end of the hopper; a distributing disk secured to the lower end of the feed worm for rotation therewith; a geared driving connection between the axle and the feed worm; a cross member rigid with the body and bridging the rear end of the body; spaced rods pivotally connected at one end to said cross member and slidable in the upper end of the rear wall of the hopper; and a pair of springs on each rod, the springs of each pair abutting against opposite faces of said rear wall and adapted to resiliently support the hopper in oblique relation to the body.

CLIFFORD E. SULLIVAN.

REFERENCES CITED

The following references are of record in the file of this patent:

UNITED STATES PATENTS

| Number | Name | Date |
| --- | --- | --- |
| 734,150 | Wilson | July 21, 1903 |
| 1,099,337 | Buchanan | June 9, 1914 |
| 1,760,455 | Van Valkenburg | May 27, 1930 |
| 2,269,987 | Raney et al. | Jan. 13, 1942 |
| 2,410,953 | Messenger et al. | Nov. 12, 1946 |
| 2,421,211 | Lutz | May 27, 1947 |

FOREIGN PATENTS

| Number | Country | Date |
| --- | --- | --- |
| 45,777 | Denmark | June 6, 1932 |
| 282,175 | Germany | Feb. 18, 1915 |